United States Patent
Schiffman et al.

(10) Patent No.: US 11,354,399 B2
(45) Date of Patent: Jun. 7, 2022

(54) AUTHENTICATION OF ENTITLEMENT CERTIFICATES

(71) Applicant: HEWLETT-PACKARD DEVELOPMENT COMPANY, L.P., Houston, TX (US)

(72) Inventors: Joshua Serratelli Schiffman, Bristol (GB); Luke T. Mather, Bristol (GB); Christopher Charles Mohrman, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 895 days.

(21) Appl. No.: 16/077,689

(22) PCT Filed: Jul. 17, 2017

(86) PCT No.: PCT/US2017/042412
§ 371 (c)(1),
(2) Date: Aug. 13, 2018

(87) PCT Pub. No.: WO2019/017883
PCT Pub. Date: Jan. 24, 2019

(65) Prior Publication Data
US 2021/0200856 A1    Jul. 1, 2021

(51) Int. Cl.
*G06F 21/45* (2013.01)
*G06F 21/60* (2013.01)
(Continued)

(52) U.S. Cl.
CPC ............ *G06F 21/45* (2013.01); *G06F 21/604* (2013.01); *G06F 21/62* (2013.01); *H04L 9/3268* (2013.01)

(58) Field of Classification Search
CPC ........ G06F 21/45; G06F 21/62; G06F 21/604; G06F 21/44; H04L 9/3268
See application file for complete search history.

(56) References Cited

U.S. PATENT DOCUMENTS

| 8,312,262 B2 | 11/2012 | Mauro et al. |
| 9,104,541 B2 | 8/2015 | Resch et al. |

(Continued)

FOREIGN PATENT DOCUMENTS

| RU | 2522024 C2 | 7/2014 | |
| WO | WO-2017053835 A1 * | 3/2017 | ........... H04L 9/3268 |

OTHER PUBLICATIONS

Chandler, "DigiCert Launches Digital Certificate Auto-Provisioning for IoT Devices", Retrieved from Internet—https://www.digicert.com/news/2017-02-06-digicert-launches-auto-provisioning-for-iot-devices/, Feb. 6, 2017, 3 Pages.

*Primary Examiner* — Chau Le
*Assistant Examiner* — Han Yang
(74) *Attorney, Agent, or Firm* — HP Inc. Patent Department

(57) ABSTRACT

A method for providing a set of certificates encoding authorisations, the method comprising processing respective ones of multiple authorisation requests at a trusted signing authority apparatus to verify respective digital signatures applied to the requests, the multiple authorisation requests received over a first communication link between the trusted signing authority apparatus and an administration apparatus, validating one or more authorisation request parameters of respective ones of the authorisation requests, generating a certificate encoding an authorisation at the trusted signing authority apparatus and transmitting the generated certificate to the administration apparatus or a requesting apparatus over a second communication link.

16 Claims, 2 Drawing Sheets

(51) Int. Cl.
    *G06F 21/62*           (2013.01)
    *H04L 9/32*            (2006.01)

(56) References Cited

U.S. PATENT DOCUMENTS

| | | | |
|---|---|---|---|
| 9,223,789 B1* | 12/2015 | Seigle | G06F 16/113 |
| 11,146,406 B2* | 10/2021 | Schiffman | H04L 63/0823 |
| 2003/0023880 A1* | 1/2003 | Edwards | H04L 63/102 |
| | | | 726/1 |
| 2004/0025022 A1 | 2/2004 | Yach et al. | |
| 2007/0094493 A1* | 4/2007 | Ali | G06F 21/34 |
| | | | 713/156 |
| 2009/0249071 A1 | 10/2009 | De et al. | |
| 2010/0150353 A1 | 6/2010 | Bauchot et al. | |
| 2011/0247055 A1* | 10/2011 | Guo | G06F 21/34 |
| | | | 726/4 |
| 2013/0326215 A1* | 12/2013 | Leggette | G06F 16/1873 |
| | | | 713/156 |
| 2014/0164764 A1 | 6/2014 | Pushkin et al. | |
| 2014/0195800 A1* | 7/2014 | Sabin | H04L 9/3268 |
| | | | 713/156 |
| 2015/0172064 A1* | 6/2015 | Takenaka | H04L 9/3247 |
| | | | 713/156 |
| 2016/0156477 A1* | 6/2016 | Deakin | G06F 9/4887 |
| | | | 713/156 |
| 2016/0337127 A1 | 11/2016 | Schultz et al. | |
| 2017/0214759 A1* | 7/2017 | Timiskov | H04L 67/10 |
| 2017/0288883 A1* | 10/2017 | Goverdhan | H04L 9/3226 |
| 2021/0152372 A1* | 5/2021 | Hunt | H04L 63/0823 |

\* cited by examiner

AUTHENTICATION OF ENTITLEMENT CERTIFICATES

BACKGROUND

In a device to device (D2D) computing environment such as a smart office or home, users or administrators can authorise a set of actions that devices can perform based on user or device policy that dictates the actions such authorisations confer. A service provider device can contact a signing authority to authorise and produce an authentication certificate. The service provider device can access a policy decision point using, for example, an online connection to an infrastructure portal to use authorisation encoding.

BRIEF DESCRIPTION OF THE DRAWINGS

Various features of certain examples will be apparent from the detailed description which follows, taken in conjunction with the accompanying drawings, which together illustrate, by way of example only, a number of features, and wherein.

DETAILED DESCRIPTION

Figure 1:
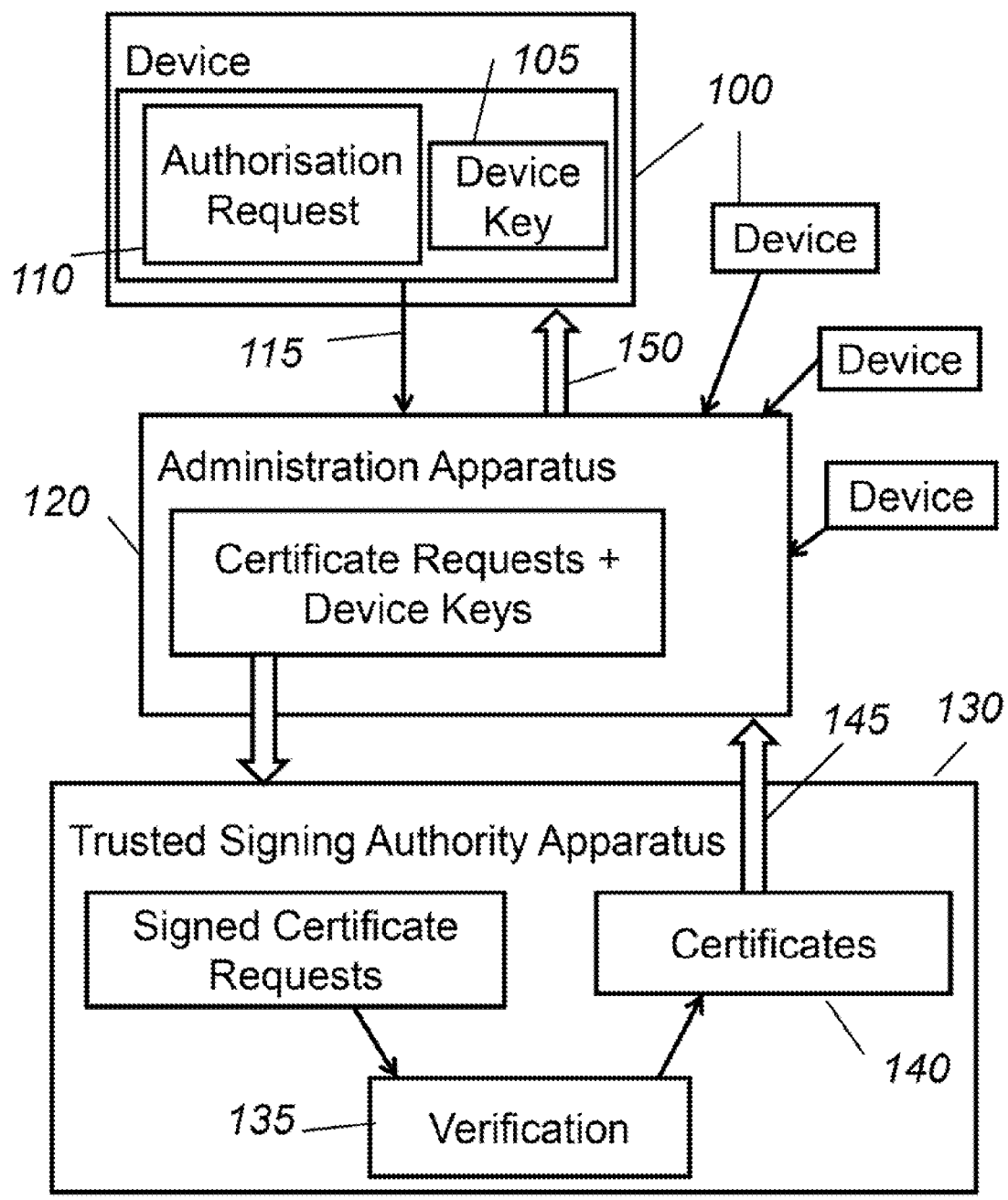
FIG. 1 shows an apparatus for providing a set of certificates that encode authorisations according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

According to an example, there is provided a method for an entitlement signing workflow to enable an administration device to collect multiple authorisation requests from devices wishing to use certain services or perform certain actions. That is, the administration device can collect multiple requests from devices wishing to obtain permission or authorization to use certain services or perform certain actions. Accordingly, certificates that encode these authorizations can be provided. The requesting device need not have a persistent connection to an infrastructure as the certificate that encodes the permissions for the device can be requested and delivered by way of an administration apparatus that can act as an effective broker between the requesting device and a trusted certificate generating apparatus.

Therefore, according to an example, authorisation rights or permissions can be encoded in a certificate. The requests for authorisation are tied to an identity of a device through a digital signature. This is done by signing the request with the private key of a device's public key pair. It can then be forwarded from the administration device to a signing authority in a single set.

In an example, the signed requests and their contents, which can be authorisation request parameters defining the scope of an authorisation request, can be authenticated and certificates encoding one or more permissions generated for the devices. The certificates can be transmitted to the devices using a different communication path to the one used to deliver the requests to the signing authority (which itself need not be secure as a result of the initial request signing).

For example, a request can be made using a low energy radio frequency communication protocol, and delivery of a certificate can be by made using a different radio frequency communication protocol such as WiFi for example. Alternatively, either or both of the request and delivery pathways can use other wireless and/or hardwired communication protocols or methods, near field communication and so on.

In an example, an authorisation request parameter can provide an indication of the device's desired entitlement to use a service. For example, a parameter can indicate whether read and/or write access to a service is requested, or if a device requests access to or use of a particular node in a network and so on.

Devices that wish to generate authorisation signing requests (ASR), for use in a protocol using access control under a trusted third-party authority can leverage their pre-existing authenticated identity to sign their requests. These requests can be transferred using any means (manually, over peer-to-peer networks, or over an infrastructure LAN or WLAN connection for example) to a signing authority. The authority can produce signed entitlements and these can be returned to the requesting devices.

The disclosed method for provisioning devices with certificates means that a device does not have to have an online connection to an infrastructure portal. The methods are suitable even when a device, or a set of many devices, require signed entitlements and are not in a position to directly connect to a signing authority.

The method can be used in scenarios where a service provider device does not have persistent access to a policy decision point, since the device can still benefit from authorization encoding. The process of generating the certificates encoding permissions uses an administration apparatus as an intermediary to enable a device to indirectly make contact with a signing authority.

In an example, an authorized administrator's device can be used to collect requests from devices and forward the requests to a signing authority. Certificates encoding the permissions that were requested by the device can be generated by the signing authority, and the resulting certificates can then be returned to the requesting devices over a channel, which may or may not be the same as the channel over which the requests were initially communicated.

FIG. 1 is a schematic representation of an apparatus for providing a set of certificates encoding one or more authorisations or permissions according to an example. Devices 100 have pre-existing identity certificates that have been signed by a trusted third-party authority. The certificates contains a unique verification key or device key 105 associated with a corresponding signing key. When a device wishes to request an authorisation 110, it generates an authorisation request and signs the request with its private signing key. Thus, the request can no longer be modified without detection by the authority. This allows the request to be transported 115 via an administration apparatus 120 to a trusted signing authority 130 using any means since no security requirements need to be placed on the transport mechanism. The requests can take any route from the requesting device to the authority.

When the authority 130 receives a request it verifies 135 the correctness of the signature as well as whether the authorisation(s) requested are acceptable. For example, the authority 130 can determine whether a requested authorisation accords with a set of allowable permissions for the device that may be preconfigured at the authority 130 and which may be periodically updated.

If both checks pass, the authority generates a certificate 140 encoding the or each requested authorisation. This certificate can be transported 145, 150 via the administration apparatus 120 back to the requesting device 100 using any transport method.

Upon receiving the certificate, the requesting device verifies the authority's signature within the certificate and whether the authorisations signed were those requested. If all checks pass, the device has been successfully provisioned with authorisations.

Figure 2:
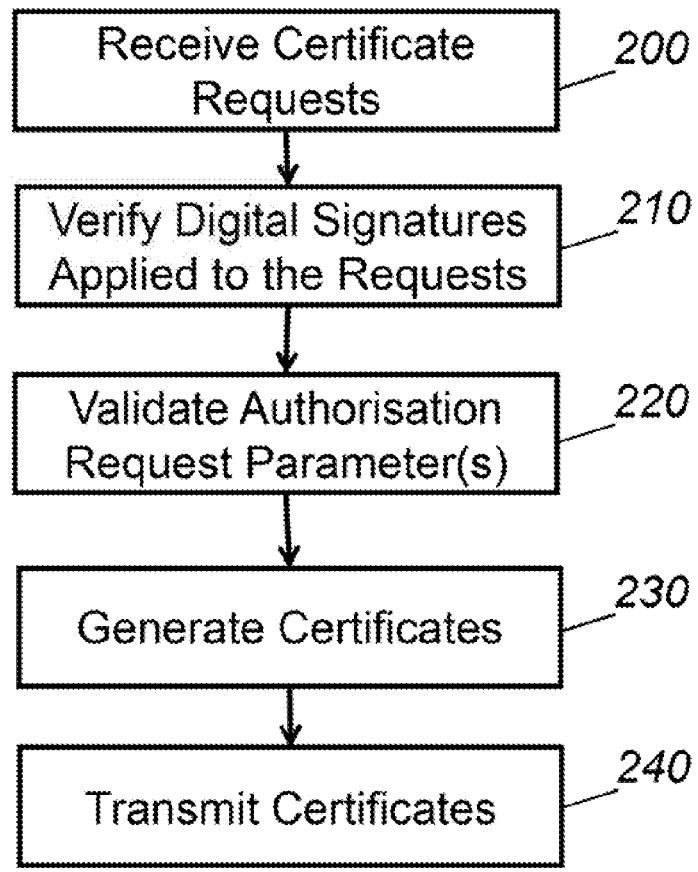
FIG. 2 shows a flow chart of a method for providing a set of certificates that encode authorisations according to an example.

FIG. 2 shows a flow chart of a method for providing a set of certificates according to an example. At block 200 the trusted signing authority apparatus receives a request for authorisation to use or access a service or apparatus (e.g. a printer or network node) via the administration apparatus from the one or more devices. At block 210 the authority verifies the digital signatures applied to the requests. At block 220 one or more request parameters are validated. At block 230 the authority generates the certificates encoding the authorisations for each respective request from the one or more devices. At block 240 the certificates are transmitted via the administration apparatus back to the one or more devices that made the respective requests.

In an example, the method for providing a set of certificates encoding authorisations uses an administrator device provisioned with authorisations that allow it to read and write to a security policy held by a participating device. These administrator devices can be mobile devices, such as phones and tablets, and can communicate with targets using a protocol such as Bluetooth Low Energy for example, which is a low energy radio frequency communication protocol. The mobile devices may not always have an infrastructure connection available to an administrator portal. Accordingly, using pre-existing authenticated device identities, these devices can generate temporary requests offline. These requests can be collected by, for example, an administrator and transported on foot to an infrastructure connected portal. This portal can then complete the remainder of the process.

According to an example, the method enables a set of requests to be collated and delivered to a signing authority in a single batch. Thus, only one member of an IT department, for example, may need to walk to an infrastructure connected machine. This is useful in a whole raft of office-of-the-future use cases. It enables a low-effort and seamless workflow for generating and authenticating short-lived entitlements for use in device administration, access and authorization protocols. The method also allows for any transport protocol or method to be used to generate an entitlement signing request and a corresponding certificate. This includes a sneakernet approach (that is, the transfer of electronic information by physically moving media comprising the information, such as magnetic tape, flash drives or external hard drives and so on, from one device to another), which in turn enables a bulk collection and collation of requests that can be ferried to an authority in one go.

The method is suitable for deployment over a variety of different transport protocols, ranging from full infrastructure communication protocols, to peer-to-peer protocols, to manual transport on a physical device.

Examples in the present disclosure can be provided as methods, systems or machine-readable instructions. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a device, an administration apparatus, a trusted signing authority apparatus, a general-purpose computer, a special purpose computer, an embedded processor or processors of other programmable data processing devices to realize the functions described in the description and diagrams. In particular, a processor or processing apparatus may execute the machine-readable instructions. Thus, modules of the administration apparatus or trusted signing authority apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 3:
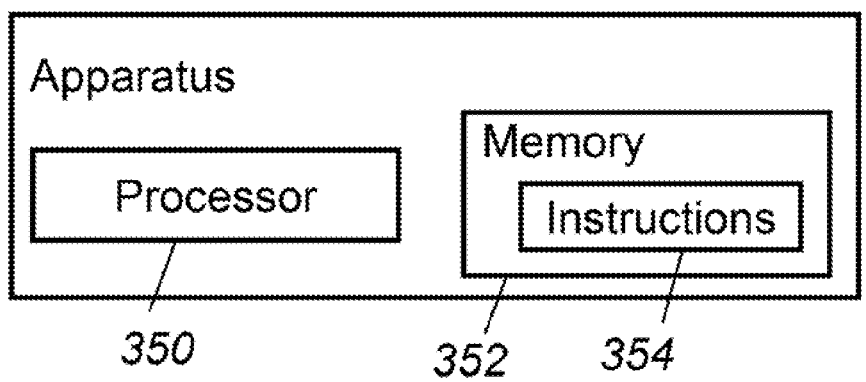
FIG. 3 shows an apparatus according to an example.

FIG. 3 shows an example of an apparatus comprising a processor 350 associated with a memory 352. The memory 352 comprises computer readable instructions 354 which are executable by the processor 350. The instructions 354 comprise:

Instructions to receive requests;
Instruction to verify digital signatures applied to the requests by the devices;
Instructions to validate one or more request parameter(s);
Instructions to generate certificates; and
Instructions to transmit certificates.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    receiving, at a trusted signing authority apparatus from an administration apparatus over a first communication link between the trusted signing authority apparatus and the administration apparatus, authorisation requests collected in a batch by the administration apparatus from respective multiple devices that are requesting authorisations to use services;
    processing, at the trusted signing authority apparatus, the authorisation requests received in the batch from the administration apparatus, and verifying, at the trusted signing authority apparatus, respective digital signatures applied to the authorisation requests using signing keys associated with corresponding identity certificates at respective devices of the multiple devices;
    validating, at the trusted signing authority apparatus, respective authorisation request parameters of the authorisation requests received in the batch from the administration apparatus;
    generating, at the trusted signing authority apparatus, a certificate encoding an authorisation requested by a device of the multiple devices; and
    transmitting, from the trusted signing authority apparatus, the generated certificate to the administration apparatus or the device over a second communication link.

2. The method of claim 1, wherein an authorisation request parameter of the authorisation request parameters comprises an indication of an entitlement to use a service by the device.

3. The method of claim 1, wherein a signing key of the signing keys comprises a private key of a device public key pair.

4. The method of claim 1, further comprising signing an identity certificate, of the identity certificates, for the device.

5. The method of claim 1, further comprising collating, at the trusted signing authority apparatus, a set of generated certificates for transmission to the administration apparatus.

6. The method of claim 1, wherein the administration apparatus is a mobile device.

7. The method of claim 1, wherein an authorisation request parameter of a first authorisation request of the authorisation requests indicates a service requested by a first device of the devices.

8. A device comprising:
    a processor; and
    a non-transitory storage medium storing instructions executable on the processor to:
        generate an authorisation request for a certificate encoding an authorisation;
        sign the authorisation request using a signing key associated with an identity certificate of the device;
        transmit the signed authorisation request to an administration device for collating the signed authorisation request of the device with signed authorisation requests of other devices to form a batch of authorisation requests;
        receive, at the device, the certificate encoding the authorisation and generated by a signing authority apparatus in response to a verification of the batch of authorisation requests by the signing authority apparatus responsive to the batch of authorisation requests being forwarded by the administration device to the signing authority apparatus; and
        verify, at the device, whether the authorisation encoded in the certificate was requested by the device in the authorisation request.

9. The device of claim 8, wherein the instructions are executable on the processor to:
    apply a digital signature to the authorisation request using a private key of a device public key pair to sign the authorisation request, wherein the signing key comprises the private key.

10. The device of claim 8, wherein the instructions are executable on the processor to:
    determine that the device has been successfully provisioned with the authorisation to use a service in response to verifying that the authorisation encoded in the certificate was requested by the device in the authorisation request.

11. The device of claim 10, wherein the authorisation to use the service comprises an authorisation to use a service of a printer.

12. A non-transitory machine-readable storage medium comprising instructions executable on a processor of a trusted signing authority apparatus to cause the trusted signing authority apparatus to:
    receive, at the trusted signing authority apparatus from an administration apparatus over a first communication link between the trusted signing authority apparatus and the administration apparatus, authorisation requests collected in a batch by the administration apparatus from respective multiple different devices that are requesting authorisations to use services;
    process, at the trusted signing authority apparatus, the authorisation requests, received in the batch from the administration apparatus and verify, at the trusted signing authority apparatus, respective digital signatures applied to the authorisation requests using signing keys associated with corresponding identity certificates at respective devices of the multiple devices;
    validate, at the trusted signing authority apparatus, respective authorisation request parameters of the authorisation requests received in the batch from the administration apparatus;
    generate, at the trusted signing authority apparatus, a certificate encoding an authorisation requested by a device of the multiple different devices; and
    transmit, from the trusted signing authority apparatus, the generated certificate to the administration apparatus or the device over a second communication link.

13. The non-transitory machine-readable storage medium of claim 12,
    wherein a signing key of the signing keys comprises a private key of a device public key pair.

14. The non-transitory machine-readable storage medium of claim 12, comprising instructions executable to cause the trusted signing authority apparatus:
    collate a set of generated certificates for transmission to the administration apparatus.

15. The non-transitory machine-readable storage medium of claim 12, wherein the administration apparatus is a mobile device.

16. The non-transitory machine-readable storage medium of claim 12, wherein an authorisation request parameter of a first authorisation request of the authorisation requests indicates a service requested by a first device of the multiple different devices.

* * * * *